United States Patent Office 2,802,599
Patented Aug. 13, 1957

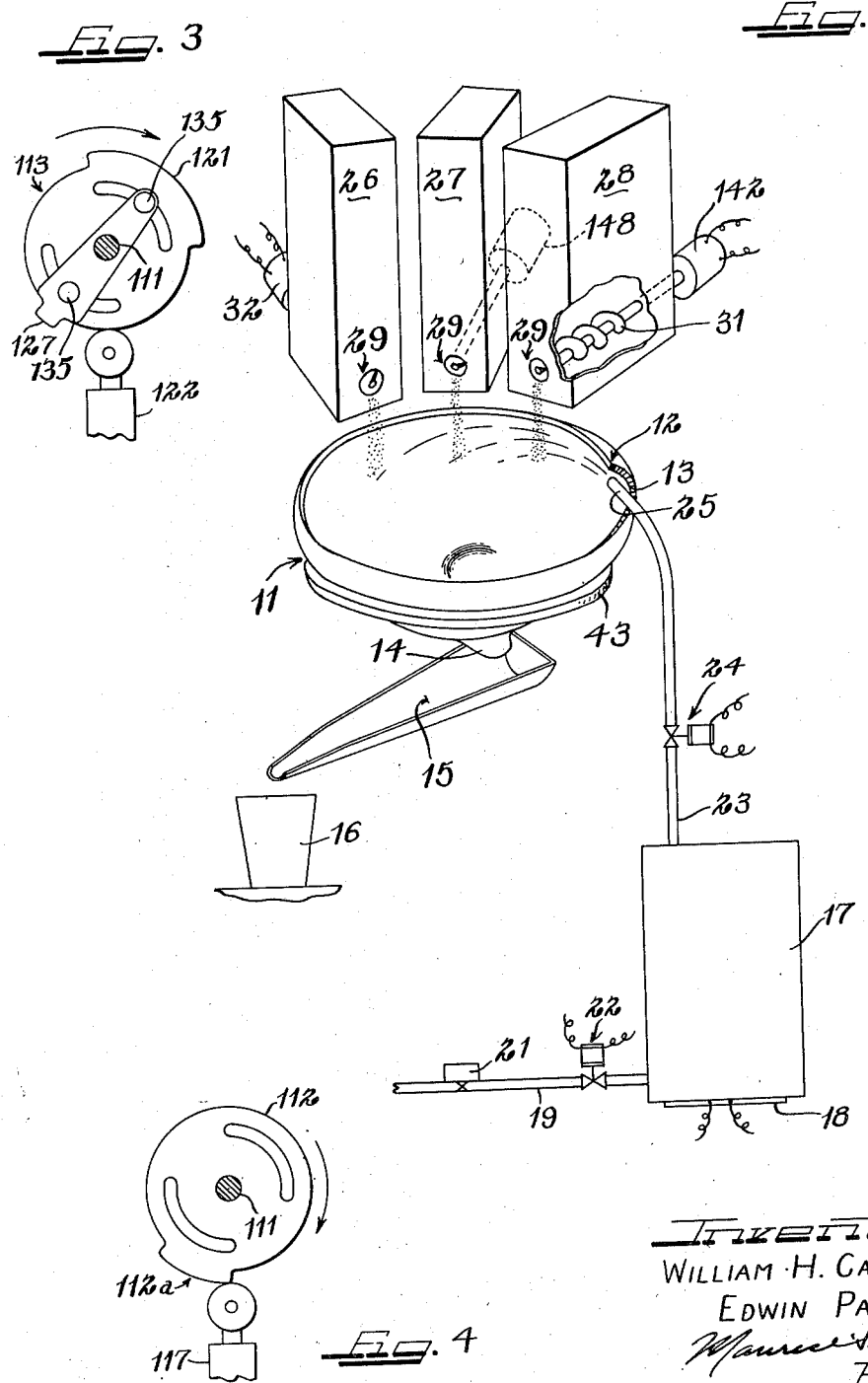

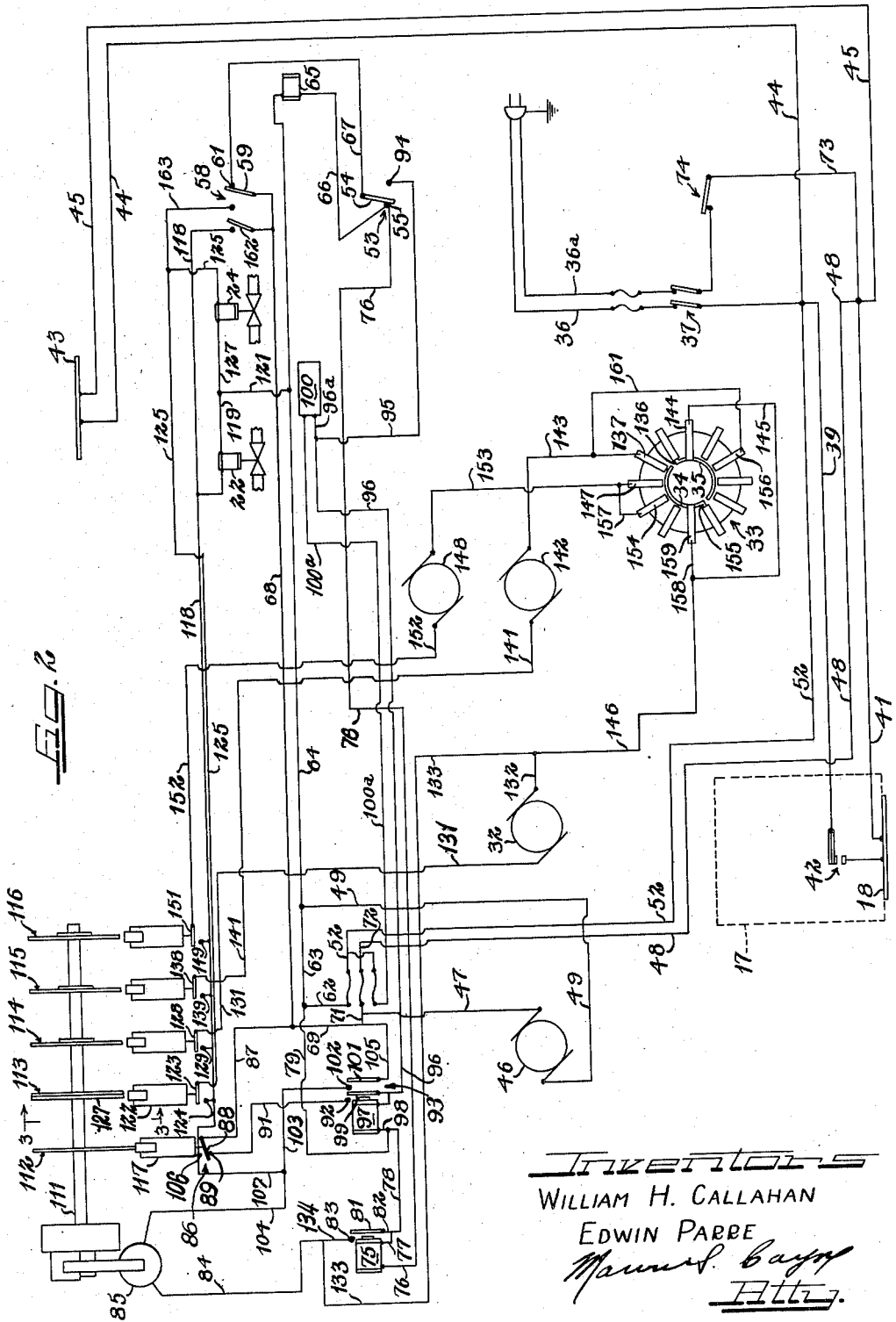

2,802,599

BEVERAGE MAKING AND VENDING MACHINE AND METHOD OF OPERATION

William H. Callahan and Edwin Parre, Aurora, Ill., assignors to Stoner Mfg. Corp., Aurora, Ill., a corporation of Illinois Application April 2, 1954, Serial No. 420,622

20 Claims. (Cl. 222—1)

The present invention relates to the method of and apparatus for mixing beverages from two or more ingredients.

Beverage vending machines of the character disclosed in this application are entirely automatic in operation and include means whereby the customer merely selects a beverage containing a combination of several ingredients contained in the machine, and then deposits a coin of a predetermined denomination. The present disclosure is concerned with a coin-controlled machine for vending hot coffee. Readily accessible selector means is provided on the machine for setting the machine to vend black coffee, coffee with cream or sugar, or coffee with cream and sugar. It is, however, not intended to limit the invention to the vending of a specific beverage or beverages because the machine herein disclosed can be utilized for vending any beverage mixture including cold beverages of selected flavors. The modification required to adapt the instant disclosure would be the substitution of a refrigerated storage vessel for the liquid ingredient in place of the water tank disclosed, and the substitution of syrup dispensers in place of containers of dry ingredients.

In the present machine, the selected ingredients are deposited in a mixing receptacle prior to being vended into a drinking cup or other vessel. It is important, therefore, that the mixing receptacle be thoroughly flushed after each dispensing operation to eliminate all traces of previously vended beverage to avoid traces of said beverage being discernible in the selected beverage. This flushing is accomplished in the present structure and method by providing novel means in the electrical circuits controlling the machine operation to cause a secondary surge of liquid ingredient (water) just before the mixed beverage has left the mixing receptacle. This means includes a novel control cam for regulating the valve that controls the flow of the liquid ingredient and also a novelly shaped mixing receptacle or bowl designed to impart a swirling motion to the liquid and other ingredients flowing into it.

It is, therefore, an object of the invention to provide novel steps in the method of making and dispensing a beverage.

Another object is to provide a novel structure and association of related elements in a beverage dispensing machine.

Another object is to provide, in a beverage vending machine, novel flow and control means for a liquid ingredient.

Another object is to provide, in a beverage vending machine, novel means for delivering liquid ingredient to the mixing receptable in a manner to maintain at all times a vacuum break or gap between the outlet end of the liquid ingredient supply line and the liquid within said mixing bowl.

Another object is to provide a beverage vending machine with a novelly constructed mixing receptacle.

Another object is to provide novel details in the construction, arrangement and cooperation of coordinate parts of a coin-controlled beverage vending machine.

Another object of the invention is to provide novel electrical apparatus which cooperates with novel mechanical elements of a coin-controlled vending machine to produce an efficient apparatus which is simple to operate, positive in operation and is self-cleaning.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a schematic view, partly in perspective, illustrating certain structural features embodied in the vending apparatus of the character described.

Fig. 2 is a schematic wiring diagram illustrating the electrical apparatus embodied in the vending machine.

Fig. 3 is a detail sectional view of one of the control elements in the electrical circuit, taken substantially along line 3—3 of Fig. 2.

Fig. 4 is a view similar to Fig. 3, showing another of the control elements.

The vending machine embodying the present invention is of the type which is housed in a suitable cabinet into which access may be gained for purposes of cleaning, repairing, adjusting or filling the various ingredient containers. In operation, a coin of proper denomination is inserted into a coin slot provided in the machine cabinet for closing an electrical circuit which functions to energize other selected electrical circuits for actuating various means provided to cause selected ingredients to be deposited into a mixing receptacle from where they are conveyed to a cup or other container positioned for convenient access to the customer. The machine includes manually adjusted means in the form of a selector switch which controls the energization of such electrical circuits as are necessary to cause operation of only those ingredient dispensers corresponding to the ingredients selected. Inasmuch as the specific construction of the coin-controlled mechanism per se is not part of the present invention, such coin-controlled mechanism is not illustrated in detail, it being understood that the present disclosure is in sufficient detail only for the purpose of illustrating and describing the features of the present invention.

Referring particularly to the schematic illustration disclosed in Fig. 1, the beverage vending machine of the character disclosed herein includes a mixing receptacle or bowl 11 which is substantially frusto-conical in shape and has its upper free edge inclined spirally and gradually rolled inwardly to provide an inwardly turned lip 12 which terminates in an abrupt shoulder, as at 13. The mixing receptacle terminates at its lower end at an open discharge spout 14 arranged to discharge the contents of the mixing receptacle into an inclined trough 15 for delivering said contents into a drinking cup or other receptacle 16.

The machine disclosed is adapted to make and vend hot coffee and consequently, at least one of its ingredients is in liquid form. This ingredient, which is water, is heated in a storage tank 17 preferably by means of a thermostatically controlled electric heater 18. The storage tank receives its supply of water through a supply line 19 having a pressure regulator 21 therein and including a normally closed solenoid controlled valve 22. A conduit 23, having a normally closed solenoid valve 24 therein, communicates with the interior of the tank 17 and has its open discharge end extended beneath the over-hanging flange or lip 12 of the mixing receptacle 11. In operation, the solenoid valve 22 is opened just prior to opening of solenoid valve 24 so that line pressure is maintained in the tank 17 and conduit 23. When both valves are open, a stream of hot water is discharged from the end of the conduit tangentially into the mixing receptacle 11 adjacent its upper perimeter. This stream swirls about the interior of the mixing receptacle and ultimately is discharged through the spout 14. The delivery end of the conduit 25 is so positioned with respect to the mixing receptacle that at no time can the level of liquid in the mixing receptacle (even assuming it to be filled to overflow) reach the said conduit. This prevents any backflow in the conduit 25 from ever occurring. When a measured quantity of water has been discharged into the mixing receptacle, the vending valve 24 is closed and shortly thereafter the valve 22 closes thus restoring water supply and delivery lines to their initial condition. The method of and means for controlling the operation of the valves 22 and 24 in the manner described hereinabove will be described in detail hereinafter.

The hot water discharged into the mixing receptacle 11 constitutes the liquid ingredient for the hot coffee to be dispensed by the machine of the present disclosure. Positioned in cooperative association with the mixing receptacle 11 are a plurality of ingredient containers 26, 27 and 28. For purposes of this description it may be assumed that the ingredient container 26 contains finely powdered coffee (instant coffee), the ingredient container 27 contains sugar and the ingredient container 28 contains powdered cream. These ingredients constitute the dry ingredients which are selectively mixed with the water in the mixing chamber 11. In a manner to be described presently, the customer can selectively condition the machine for dispensnig any one or more of the dry ingredients into the mixing receptacle. It is sufficient at this time to observe that each dry ingredient container 26, 27 and 28, has a discharge opening 29 disposed directly above and closely adjacent to but inwardly of the over-hanging flange or lip 12 so that ingredients dispensed through the openings 29 will fall into the mixing chamber and become admixed with the hot water while said water is being swirled therein toward the discharged spout 14.

The specific means provided for effecting selective discharge of a measured quantity of one or more of the dry ingredients is more fully described hereinafter; however, it is necessary that suitable power operated means, such as feed augers 31 illustrated in Fig. 1, be provided in each of the containers. The feed auger in each container 26, 27 and 28 is connected to actuating means preferably in a form of electric motors 32, 148 and 142 respectively. As will be better understood as the description proceeds, the operation of the machine insofar as it has been described is substantially as follows:

After the customer has selected the one or more dry ingredients to be mixed with the beverage, he deposits a coin in the coin slot previously referred to, to thereby close and effect energization of a main and selected electrical circuits. The initial operation of the machine is to deliver hot water or other liquid ingredient to the mixing receptacle 11. This delivery of water is followed immediately by the delivery into the mixing receptacle of the selected dry ingredient or ingredients. When the predetermined quantity of the dry ingredient or ingredients has been discharged, the actuating means for delivery of such ingredient discontinues its operation after which the flow of water to the mixing receptacle is shut off. This establishes a method of mixing wherein the dry ingredient is fed into the mixing receptacle only while the liquid ingredient is being delivered thereto. The electrical circuits controlling the operation of the various valves and actuating means referred to hereinabove includes novel means to reopen the valve 24 momentarily after it has closed following the delivery of dry ingredients to the mixing receptacle. This momentary reopening of the liquid ingredient conduit 23 results in the flow, into the mixing receptacle, of clear liquid ingredient at a time when the admixture has substantially drained from the mixing receptacle thereby causing said mixing receptacle to be flushed thoroughly to remove all traces of the beverage just vended.

The front of the machine carries a selector dial (not shown) which has thereon the notations "Coffee," "Coffee with Sugar," "Coffee with Cream" and "Coffee with Cream and Sugar." A manually manipulable knob and pointer is associated with the dial and is operatively connected to a selector switch 33 (Fig. 2), which includes a pair of movable segments 34—35 and a plurality of contact or terminal blades more fully described hereinafter in the description of the specific operation of the machine. A main electrical supply line 36—36a is, of course, closed through a main switch 37 to supply electric current to the various components of the control apparatus. When the main switch 37 is closed, electric current is supplied to a heater 18 through lines 39—41, provided to maintain the temperature of liquid ingredient (water) in tank 17 at a predetermined temperature, said temperature being regulated by a thermostat switch 42. A heating plate 43, arranged beneath and in heat transfer relationship with the mixing receptacle 11, also is supplied with electric current through lines 44—45 for the purpose of maintaining the mixing receptacle at a predetermined high temperature to insure that the beverage mixed therein and discharged into the cup 16 is of a desired temperature. Because the feed openings in the dry ingredient containers may become caked due to steam rising from the mixing receptacle, a blower including a motor 46 is rendered operative when current flows through lines 47—48—49—63—62 and 52. This blower functions at all times to maintain a constant stream of air flowing over and around the mixing receptacle 11 to carry away steam rising therefrom.

The apparatus includes a coin control mechanism having a coin actuated switch 53. The switch includes a contact arm 54 and a pair of contacts 55 and 94. Normally the switch is held closed through contact 55. This switch is especially useful to prevent cheating, as for example, by a customer suspending the coin from a string and holding it in position to retain the switch arm 54 in contact with the contact 94.

A double pole manually operated switch 58, hereinafter termed the water switch, is provided also. This switch 58 has its arm 59 in closed contact with its terminal 61 at all times during normal machine operation. The circuit normally made by these two switches is as follows:

From supply line 36, main switch 37, lines 52—62—63 and 64, coin plate locking relay 65, line 66, terminal 55, switch arm 54, line 67, water switch terminal 61, switch arm 59, return lines 68—69—71—72—48 and 73, a normally closed waste container switch 74, main switch 37 and supply line 36a. This results in the coin plate locking relay 65 being energized.

At this normal condition of the circuits, an anti-jackpot relay 75 is energized. The circuit to this relay is from the coin switch terminal 55 through line 76, the coil in relay 75, lines 77—78—79 and 62 and then back to the supply line 36.

With the anti-jackpot relay energized its switch arm 81, connected by a lead 82 with line 78, closes with contact 83 connected in a line 84 to a timer motor 85.

Another normally open circuit is partially established at this time through a normally closed master cam actuated switch 86 from line 68, through line 87, switch arm 88, terminal 89 and line 91 to a terminal 92 of a normally open double pole switch 93.

*Dispensing black coffee*

Now assuming that the selector switch 33 is set, as illustrated in Fig. 2, to condition the machine to dispense black coffee, a coin is deposited in a conventional coin chute (not shown). In passing through said chute the coin momentarily moves the coin switch arm 54 out of contact with its terminal 55 thus de-energizing the coin plate locking relay 65 and anti-jackpot relay 75 and momentarily making contact with its second terminal 94. The temporary circuit then established is as follows:

From the main line 36a, main switch 37, waste container switch 74, lines 73—48—72—71—69 and 68, water switch 58, line 67 to coin switch arm 54, terminal 94, lines 95 and 96 to one terminal of a starting relay 97, and from said starting relay through a line 98, lines 79—62 and 52 back through main switch 37 to supply line 36.

When the coil in the starting relay 97 is energized momentarily it closes its associated double pole switch 93, thus closing a circuit from the live switch terminal 92, one switch arm 99 to the return line 96. A counter 100 is momentarily energized to record operation of the machine. The circuit to the counter is as follows:

Line 91, terminal 92, switch arm 99, lines 96 and 96a through the counter 100, and line 100a to the return line 52. The other switch arm 101 of relay switch 93 closes with a terminal 102 connected by lines 103 and 104 to the timer motor 85.

The timer motor circuit initially established is as follows:

Supply line 36, main switch 37, lines 52—62—79 and 78, switch arm 81, terminal 83, line 84, motor 85 and back through lines 104—103, terminal 102, switch arm 101, a line 105, lines 71—72—48 and 73, waste container switch 74, main switch 37 and return supply line 36a.

As soon as the coin has passed the coin switch the contact 54—94 is broken by the return of the arm 54 into contact with terminal 55. The starting relay 97 remains energized through a circuit completed in the following manner: lines 71—69 and 87, switch arm 88, terminal 89, line 91, terminal 92, switch arm 99, to relay 97, and lines 98—79—62 and 52. At the same instant, however, the anti-jackpot relay 75 is reenergized to return its related switch arm 81 into contact with its terminal 83. The motor 85, which has started to operate when the starting relay was energized, will continue to operate without interruption. The current source to the motor 85 through line 104 is delivered initially as stated hereinabove through the closed switch terminals 88—89 of the master cam switch 86. However, immediately following motor operation, the master cam switch 86 is reversed to open contacts 88—89 and close contacts 88—106. The circuit to the motor is now as follows:

Supply line 36, master switch 37, lines 52—62—79 and 78, anti-jackpot relay switch arm 81, terminal 83, line 84 to the motor 85, return line 104, a line 107, terminal 106, master cam switch arm 88, lines 87—69—71—72—48 and 73, waste container switch 74, master switch 37 and supply line 36a.

It should be observed at this time that the timer motor 85 has a driven shaft 111 upon which is mounted firmly a master cam 112 and a plurality of related cams 113, 114, 115 and 116, each of which is arranged to actuate an associated switch, respectively, at predetermined times, and for fixed intervals during one complete cycle of operation of the motor 85. These cams and their specific operation will receive attention presently, but it should be observed at this time that the master cam 112 (Fig. 4) has a relatively long land surface 112a extending slightly less than one-eighth (approximately 50 degrees) of the circumference of the cam. This land surface is so positioned (Fig. 4) with respect to the associated switch actuating plunger 117 that shortly following initial motor operation, the land surface rides off of the plunger 117, thus permitting it to rise and thereby reverse the position of its related switch arm 88 in the manner previously described. The switch arm 88 will, therefore, remain in contact with terminal 106 until such time as the land again encounters, depresses and holds depressed, the plunger 117. This time interval during which the switch arm 88 closes its circuit through the terminal 106 constitutes the full operating cycle of the vending operation.

When the switch arm 88 is in contact with terminal 106, a line 118 leading to one terminal of the coil in the main water valve relay 22 is energized, thus closing a circuit through said line 118, relay 22, lines 119—121—64—63—62 and 52 to main switch 37 and supply line 36. The main water valve will thereby open to connect the main water supply line 19 with the water storage tank 17, and it remains open through the operating cycle of the machine.

With the foregoing circuits completed and the timer motor operating, the next step in the mixing and vending operation is the delivery of hot water from the storage tank 17 to the mixing receptacle. This is effected by action of the water control cam 113 carried on motor shaft 111. As is best shown in Fig. 3, this cam includes a high land 121 on approximately 100 degrees of its diameter, which land is positioned to engage and depress a switch plunger 122 for closing a switch arm 123 with a terminal 124 in line 118. Closing the switch completes the following circuit for opening the water vending valve 24:

From energized line 118 through the switch 123—124, lines 125 and 126 to the coil on valve 24 and return lines 127—121—64—63—62 and 52 back to the supply line 36 through the main switch 37.

The vending valve 24 will, therefore, remain open while the land 121 on cam 113 moves over the switch plunger 122, and it is during this water delivery period that the other ingredient or ingredients are delivered to the mixing receptacle, as will be described presently. After the circuit to the vending valve has opened to cause the valve to close it will remain in closed position for a predetermined interval at which time the valve is again opened momentarily so as to deliver a surge of water into the mixing receptacle to flush it of any residue. This delayed surge is effected by providing, on the cam 113, a secondary high land 127 spaced about 120 degrees from the drop off end of the main land 121. While the second land is passing over the switch plunger 122, which is depressed thereby, the circuit described in the paragraph immediately preceding is re-established.

During the interval when the principal supply of water 75 is being delivered to the mixing bowl, a measured charge of one dry ingredient, in this instance coffee, is delivered to the mixing receptacle. This delivery of coffee is accomplished by operation of cam 114 on motor shaft 111. The cam 114 is similar to the water cam 113 but is without the secondary land found on said cam 113, and it operates to close a switch 128—129 to complete a circuit for operating the coffee discharge actuating motor 32. Specifically, the cam surface on the cam 113 is about 50 degrees in length and it is set with respect to the cam 113 (30 degrees lag) so as to become effective after the water starts to flow and cease its effectiveness prior to the stoppage of the water flow. Thus there is a flow of water within the mixing receptacle prior to the discharge of coffee. The circuit closed by operation of this cam is, from energized line 118, as follows:

Through switch 129—128, a line 131, motor 32 and lines 132—133 and 134, terminal 83, switch arm 81, lines 82—78—79—62 and 52, and then back to the supply line 36 through the main switch 37. When the required quantity of coffee has been dispensed into the mixing receptacle the cam 114 operates to open the switch 128—129, thus de-energizing the coffee discharge actuating motor 32 and stopping the dispensing of coffee. This operation is in advance of the closing of the water control switch 123—124, hence water is delivered to the mixing receptacle after the coffee has ceased to be delivered thereto, with the result that substantially all traces of coffee are entrained in the water and will drain therewith out of the discharge spout 14.

Flushing mixing receptacle

As indicated hereinabove, there may be a small residue of coffee floating on the swirling water even under the foregoing delay in stoppage of initial water flow. As the mixture drains out of the mixing receptacle some of this residue adheres to the receptacle wall, and unless removed results in it being entrained in the water flow during the next succeeding machine operation or caking upon said wall. Either condition is very objectionable, consequently the water cam 113 has thereon the secondary cam surface or land in the form of the adjustable member 127 (Fig. 3). This member is set at a predetermined position and is secured by its mounting screws 135. Its position relative to the position of the drop off edge of the cam portion 121 on cam 113 is such as to allow for a short interval, during which no water flows to the mixing receptacle. However, when the cam member 127 engages and again closes the switch 123—124 the circuit to the water vending valve 24 is re-energized and the valve is reopened for a short period of time so as to deliver a surge of fresh water to the mixing receptacle. This occurs at about the time the mixture of water and coffee has substantially drained out of the mixing receptacle. As a consequence, the fresh water supply, swirling around the upper perimeter of the bowl and flowing down its interior surface toward the discharge spout 14, washes or flushes any residue from the receptacle wall and leaves it clean so as not to contaminate the next succeeding mixture to be vended. The operation of the machine for vending black coffee has now been completed, and as soon as the timer motor completes its cycle of operation, which is one complete revolution of shaft 111, the circuit thereto is broken. All of the electrical circuits and control cams are thus restored to their initial or normal condition.

Dispensing coffee with cream

When it is desired to dispense coffee with cream the selector switch 33 is positioned to locate the salient 136 in contact with terminal plate 137 of said switch. The machine is operated and functions in the manner described hereinabove when mixing and vending black coffee, but in addition now causes the vending means 31, for delivering cream to the mixing receptacle, to be actuated. In other words, cream is dispensed at the same time as the coffee is dispensed, and the mechanism and circuits for accomplishing this additional operation is as follows:

The cam 115 (like cam 114) on the timer motor shaft 111 operates to close switch terminals 138—139. This closes the following circuit: From energized line 118, switch terminals 139—138, line 141, cream delivery actuating motor 142, line 143, terminal plate 137, salient 136 on segment 35, a terminal plate 144, lines 145—146 to energized line 133 leading to one terminal of the coffee dispensing actuating motor 132.

Dispensing coffee with sugar

Should coffee with sugar only be desired, the selector switch 33 is set to locate the salient 136 in contact with a terminal plate 147. The circuit to the sugar dispensing actuating motor 148 is then as follows: from the energized line 118 through switch terminals 149—151, which are moved into contact with each other by the cam 116 on timer motor shaft 111, line 152, motor 148, line 153, terminal plate 147, salient 136, segment 35, terminal plate 144 and lines 145—146 to the live line 133 leading to the coffee dispensing actuating motor 32. Thus sugar is vended at the same time coffee is vended and in an amount determined by the length of time the cam 116 holds the switch terminals 149—151 closed.

Dispensing coffee with cream and sugar

If coffee with cream and sugar is desired, the selector switch 33 is again adjusted to place the salient 136 in engagement with a terminal plate 154. When this is accomplished a salient 155 on switch segment 34 comes into contact with a terminal plate 156. The circuit through the selector switch to the sugar dispensing actuating motor 148 is now as follows: from the energized coffee feed line 133, lines 146—145, terminal plate 144 to segment 35, salient 136, terminal plate 154, lines 157—153 to the sugar dispensing actuating motor 148: the remaining circuit from said motor to the current source being as previously described. At the same time, however, current from line 146 flows through a line 158, a terminal plate 159, segment 34, its salient 155, terminal plate 156 and lines 161—143 to one terminal of the cream delivering actuating motor 142. The circuit to the other terminal of said motor through line 141 is the same as previously described with reference to delivery of cream only.

It might be noted that the selector switch terminal plates are so arranged that the desired beverage selection can be obtained upon adjustment of said selector switch in either direction, and that because of the presence of two diametrically opposed main feed terminal plates 144—159 the desired circuits will be completed irrespective of which one of the two salients 136 or 155 is brought into electrical contact with the selected terminal plate or plates.

In order to permit cleaning of the mixing receptacle by flowing clear water through it, there is provided the double pole switch 58 previously mentioned. This switch is manually operated to supply electric current to the coils in valve relays 22—24 through switch blades 59—162 and lines 163 and 118, respectively, so as to open said main and vending water valves while the switch is held in such circuit closing position.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. In a beverage mixing and dispensing machine, a mixing receptacle, a source of liquid ingredient, a conduit leading from said source of liquid ingredient to the mixing receptacle, a valve in said conduit, a solenoid for controlling the operation of said valve, a container for a second ingreident for the beverage, a discharge opening in said container in communication with said mixing receptacle, a feed member in said container, a motor for operating said feed member to discharge the second ingreident through the opening and into the mixing receptacle, means operative to first open the solenoid valve and then operate the feed member, said means being effective after a predetermined period of time to first stop operation of the feed member and then close the valve, and means included in said operative means to reopen the valve momentarily to cause discharge of a predetermined quantity of the liquid ingredient into the mixing receptacle to wash residue from said receptacle.

2. In a beverage mixing and dispensing machine, a mixing bowl, a source of liquid ingredient, a conduit leading from said source of liquid ingredient to the mixing bowl, said conduit being arranged to discharge liquid ingredient substantially tangentially within said mixing bowl, a valve in said conduit, a solenoid for controlling the operation of said valve, a container for a second ingredient for the beverage, a discharge opening in said container in communication with said mixing bowl, a feed member in said container, means for operating said feed member to discharge the second ingreident through the opening and into the mixing bowl, means operative to first open the solenoid valve and then operate the feed member, said means being effective after a predetermined period of time to stop operatiton of the feed member and then close the valve, and means included in said operative means to reopen the valve momentarily to cause discharge of a predetermined quantity of the liquid ingredient into the mixing bowl to wash residue from said bowl.

3. In a beverage mixing and dispensing machine, a mixing receptacle, a conduit leading from a pressurized source of liquid ingredient to the mixing receptacle, a valve in said conduit, a solenoid in operative association with said valve for controlling the operation thereof, a container for a dry ingredient for the beverage, a discharge opening in said container in communication with said mixing receptacle, a screw-feed member in said container, means for operating said screw-feed member to discharge the dry ingredient through the opening and into the mixing receptacle, means operative to first open the solenoid valve and then operate the screw-feed member, said means being effective after a predetermined period of time to stop operation of the screw-feed member and then close the valve, and means included in said operative means to reopen the valve momentarily to deliver a surge of the liquid ingredient into the mixing receptacle to wash residue from said receptacle.

4. In a beverage mixing and dispensing machine, a mixing receptacle, a conduit leading from a source of liquid ingredient to the mixing receptacle, a valve in said conduit, a container for a second ingredient for the beverage, a discharge opening in said container in communication with said mixing receptacle, a power operated feed member in said container, operable to discharge the second ingredient through the opening and into the mixing receptacle, automatic means to first open the valve and then operate the feed member, said means being effective after a predetermined period of time to stop operation of the feed member and then close the valve, and means included in said automatic means to actuate the valve to discharge a sufficient quantity of the liquid ingredient into the mixing receptacle to wash residue from said receptacle.

5. In a selective beverage mixing and vending machine, a plurality of ingredient containers and discharge means therein, a mixing receptacle adapted to receive ingredients discharged from one or more of said containers upon operation of the discharge means therein, a source of liquid, a normally closed conduit for delivering liquid to said mixing receptacle, means to actuate each of said discharge means, operable means effective to first open the liquid conduit and then cause the discharge of said ingredients into the mixing receptacle and to close said conduit after the discharge of the said ingredients is completed, and means included in said operable means to reopen the said conduit momentarily to wash residue from the mixing receptacle.

6. In a selective beverage mixing machine, a plurality of ingredient containers and discharge means therein, a mixing bowl adapted to receive ingredients discharged from one or more of said containers upon operation of the discharge means therein, a source of liquid, a normally closed conduit for delivering liquid to said mixing bowl, means to actuate each of said discharge means, means to actuate a selected one or more of said actuating means, said last named means being effective to first open the liquid conduit and then cause the discharge of ingredients into the mixing bowl and to close said conduit after the discharge of the said ingredients is completed, and means included in said last named means to reopen the said liquid conduit momentarily to deliver a surge of liquid ingredient to the mixing bowl to wash residue from the same.

7. In a selective beverage mixing machine, a plurality of ingredient receptacles and discharge means therein, a mixing bowl adapted to receive ingredients discharged from one or more of said receptacles upon operation of the discharge means therein, a container for liquid ingredient, a line connecting said container with a supply gredient, a valve in said line, a second valve for admitting source, a valve in said line, a second valve for admitting liquid from said container to said mixing bowl, actuating means for each of said discharge means, means operable to actuate one or more of said actuating means, said operable means being effective to first open the liquid control valves and then cause the discharge of ingredients into the mixing bowl and to close said second valve after the discharge of the said ingredients is completed, and means to reopen the second valve momentarily to wash residue from the mixing bowl, said operable means causing said second valve to lag behind the opening of the valve in the supply line and causing said valve in the supply line to lag behind the final closing of the second valve.

8. In a selective beverage mixing machine, a plurality of ingredient receptacles and discharge means therein, a mixing bowl adapted to receive ingredients discharged from one or more of said receptacles upon operation of the discharge means therein, a container for a liquid ingredient, a line connecting said container with a source of supply, a valve in said line, a second valve for admitting liquid from said container to said mixing bowl, actuating means for each of said discharge means, means operable to actuate one or more of said actuating means, said operable means being effective to first open the liquid control valves and then cause the discharge of said ingredients into the mixing bowl and to close said second valve after the discharge of said ingredients is completed, and means to reopen said second valve momentarily to wash residue from the mixing bowl, said valve in the supply line opening prior to initial opening of the second valve and remaining open until after delivery of the flush liquid.

9. The method of mixing a beverage composed of at least one dry ingredient and a liquid ingredient, which consists of first initiating the flow of liquid ingredient to a mixing receptacle having an outlet, delivering a measured quantity of dry ingredient to said receptacle, stopping the flow of liquid ingredient after all of the dry ingredient has been delivered to the receptacle, permitting the mixture to substantially drain from the mixing receptacle through said outlet and finally delivering a surge of the liquid ingredient to the mixing receptacle to wash residue from said receptacle.

10. The method of mixing a beverage composed of at least one dry ingredient and a liquid ingredient, which consists of first initiating the flow of liquid ingredient to a mixing receptacle having an outlet, delivering a dry ingredient to said receptacle, stopping the flow of dry ingredient to the receptacle, shutting off the flow of liquid ingredient after the flow of dry ingredient has ceased, permitting the mixture to substantially drain from the mixing receptacle, and finally delivering a surge of liquid ingredient to the mixing receptacle to wash residue from said receptacle.

11. The method of mixing a beverage composed of at least one dry ingredient and a liquid ingredient, which consists of first initiating the flow of the liquid ingredient and a measured quantity of dry ingredient to a mixing receptacle having an outlet, shutting off the flow of liquid ingredient after all of the dry ingredient has been delivered to the receptacle, permitting the mixture to substantially drain from the mixing receptacle through said outlet and finally delivering a surge of liquid ingredient to the mixing receptacle to wash residue from said receptacle.

12. The method of mixing a beverage composed of several ingredients at least one of which is liquid, which consists of first initiating the flow of the liquid ingredient to a mixing receptacle having an outlet, causing said liquid ingredient to swirl within said mixing receptacle, delivering a measured quantity of the other ingredient to said receptacle, stopping the flow of liquid ingredient after all of the other ingredient has been delivered, permitting the mixture to substantially drain from the mixing receptacle, and finally delivering a surge of liquid ingredient to the mixing receptacle to wash residue from said receptacle.

13. The method of mixing a beverage composed of several ingredients at least one of which is liquid, which consists of first initiating the flow of the liquid ingredient to a mixing receptacle having an outlet, delivering a measured quantity of the other ingredient to said receptacle, stopping the flow of liquid ingredient after all of the other ingredient has been delivered, permitting the mixture to substantially drain from the mixing receptacle, and finally causing a surge of the liquid ingredient to flow into the receptacle to wash residue therefrom.

14. The method of mixing a beverage composed of several ingredients at least one of which is liquid, which consists of first initiating the flow of the liquid ingredient to a mixing receptacle having an outlet, delivering a measured quantity of the other ingredient to said receptacle, stopping the flow of liquid ingredient after all of the other ingredient has been delivered, permitting the mixture to substantially drain from the mixing receptacle, and finally delivering a surge of liquid ingredient to the mixing receptacle to flush said receptacle.

15. The method of mixing a beverage composed of several ingredients at least one of which is liquid, which consists of first initiating the flow of the liquid ingredient to a mixing receptacle having an outlet, causing said liquid ingredient to swirl within said mixing receptacle, delivering a measured quantity of the other ingredient to said receptacle, stopping the flow of liquid ingredient after all of the other ingredient has been delivered, permitting the mixture to substantially drain from the mixing receptacle, and finally causing a surge of liquid ingredient to swirl through the receptacle to wash residue therefrom.

16. In a beverage making and vending machine, a plurality of containers for beverage ingredients, a dispensing mechanism for each container respectively, an electrically operable actuating element for each dispensing mechanism respectively, a selector switch device having a plurality of fixed contacts each being electrically connected to a respective one of said actuating elements, a manually manipulable contact plate engageable with two or more of said contacts simultaneously whereby desired ingredients are selected, a supply circuit having said fixed contacts and said actuating elements interposed therein, means for closing the supply circuit through the contact plate, the fixed contacts engaged thereby and corresponding actuating elements for dispensing certain of said preselected ingredients, a liquid supply source having a normally closed valved outlet, electrically operated means for opening the valve, an electrical circuit for said last mentioned means connected to the supply circuit, means for closing said valve circuit when the supply circuit is closed and opening it only after the aforesaid dispensing mechanism has stopped, and means included in said valve support closing means for again momentarily closing the valve circuit.

17. In a beverage making and vending machine, a plurality of containers for drink ingredients, a dispensing mechanism for each container respectively, an actuating element for each dispensing mechanism respectively, a selector device connected to said actuating elements, means effective to operate one or more of the actuating elements for dispensing measured quantities of selected ingredients, a liquid supply source having a normally closed valved outlet, control means for opening the valve when the selected actuating elements are operative and for closing the valve after the completion of the operating cycle of said actuating elements and means included in said valve control means for again opening the valve momentarily.

18. In a beverage dispensing apparatus, in combination, supply means for a plurality of dry ingredients, supply means for a liquid ingredient, delivery means for one or more of said dry ingredients and said liquid ingredient, a mixing bowl for receiving the said ingredients, means for controlling the delivery whereby a portion of the liquid ingredient will be introduced into the mixing bowl before delivery of any dry ingredient and for continuing the delivery of the liquid ingredient until after the total amount of dry ingredient has been delivered into the mixing bowl, and means in said control means to permit resumption of delivery of liquid ingredient momentarily to wash residue from the mixing bowl.

19. In a beverage dispensing apparatus, in combination, supply means for a plurality of dry ingredients, supply means for a liquid ingredient, delivery means for one or more of said dry ingredients and said liquid ingredient, a mixing bowl for receiving the said ingredients, means for controlling the delivery whereby a portion of the liquid ingredient will be introduced into the mixing bowl before the delivery of any dry ingredient and for continuing the delivery of the liquid ingredient until after the total amount of dry ingredient has been delivered into the mixing bowl, and means included in said control means for stopping the flow of liquid ingredient near the completion of delivery of its total quantity and for then resuming the flow of the same to complete the delivery of the total quantity of the flow, said last mentioned flow being effective to wash residue from the mixing bowl.

20. In a beverage mixing and dispensing machine, a mixing bowl, a source of liquid ingredient, a conduit leading from said source of liquid ingredient to the mixing bowl, said conduit being arranged to discharge liquid ingredient substantially tangentially within said mixing bowl, at a level above the highest possible level which may be reached by liquid in said bowl, a valve in said conduit, a solenoid for controlling the operation of said valve, a container for a second ingredient for the beverage, a discharge opening in said container in communication with said mixing bowl, a feed member in said container, means for operating said feed member to discharge the second ingredient through the opening and into the mixing bowl, means operative to first open the solenoid valve and then operate the feed member, said means being effective after a predetermined period of time to stop operation of the feed member and then close the valve, and means included in said operative means to reopen the valve momentarily to cause discharge of a predetermined quantity of the liquid ingredient into the mixing bowl to wash residue from said bowl.

References Cited in the file of this patent

UNITED STATES PATENTS

| | | |
|---|---|---|
| 1,754,757 | Moore | Apr. 15, 1930 |
| 2,021,518 | Pieper | Nov. 19, 1935 |
| 2,261,338 | Carlson | Nov. 4, 1941 |
| 2,346,290 | Carlson | Apr. 11, 1944 |
| 2,376,403 | Thompson et al. | May 22, 1945 |
| 2,614,738 | Mills | Oct. 21, 1952 |
| 2,617,510 | Little | Nov. 11, 1952 |
| 2,621,838 | Price | Dec. 16, 1952 |
| 2,627,961 | Burnside | Feb. 10, 1953 |
| 2,637,431 | Harris | May 5, 1953 |
| 2,653,733 | Rudd et al. | Sept. 29, 1953 |
| 2,658,645 | Harris | Nov. 10, 1953 |
| 2,661,827 | Munz et al. | Dec. 8, 1953 |